US008868469B2

United States Patent
Xu et al.

(10) Patent No.: US 8,868,469 B2
(45) Date of Patent: *Oct. 21, 2014

(54) SYSTEM AND METHOD FOR PHRASE IDENTIFICATION

(75) Inventors: Liqin Xu, Scarborough (CA); Hyun Chul Lee, Thornhill (CA)

(73) Assignee: Rogers Communications Inc., Toronto, Ontario (CA)

( * ) Notice: Subject to any disclaimer, the term of this patent is extended or adjusted under 35 U.S.C. 154(b) by 873 days.

This patent is subject to a terminal disclaimer.

(21) Appl. No.: 12/775,547

(22) Filed: May 7, 2010

(65) Prior Publication Data

US 2011/0093414 A1     Apr. 21, 2011

Related U.S. Application Data (60) Provisional application No. 61/251,790, filed on Oct. 15, 2009.

(51) Int. Cl.
*G06F 15/18* (2006.01)
*G06F 17/27* (2006.01)

(52) U.S. Cl.
CPC .................................. *G06F 17/27* (2013.01)
USPC ........ 706/12; 704/1; 704/9; 704/10; 707/754; 707/755

(58) Field of Classification Search
USPC ................ 706/12; 704/1, 9, 10; 707/754, 755
See application file for complete search history.

(56) References Cited

U.S. PATENT DOCUMENTS

| | | | |
|---|---|---|---|
| 6,104,990 A | 8/2000 | Chaney et al. | |
| 7,162,413 B1 | 1/2007 | Johnson et al. | |
| 7,263,530 B2 | 8/2007 | Hu et al. | |
| 7,970,808 B2 * | 6/2011 | Konig et al. | 707/962 |
| 8,190,628 B1 * | 5/2012 | Yang et al. | 707/767 |
| 2003/0046263 A1 | 3/2003 | Castellanos et al. | |
| 2004/0083224 A1 * | 4/2004 | Yoshida | 707/100 |
| 2005/0071148 A1 | 3/2005 | Huang et al. | |
| 2006/0206313 A1 * | 9/2006 | Xu et al. | 704/10 |
| 2007/0067157 A1 | 3/2007 | Kaku et al. | |
| 2007/0225968 A1 | 9/2007 | Murakami et al. | |
| 2007/0244882 A1 | 10/2007 | Cha et al. | |
| 2008/0201411 A1 | 8/2008 | Paritosh | |
| 2008/0221863 A1 * | 9/2008 | Liu et al. | 704/2 |
| 2008/0243479 A1 * | 10/2008 | Cafarella et al. | 704/9 |
| 2009/0063132 A1 | 3/2009 | Miyazaki | |
| 2009/0070327 A1 | 3/2009 | Loeser et al. | |
| 2009/0116736 A1 | 5/2009 | Neogi et al. | |

OTHER PUBLICATIONS

"Automated Patent Document Summarization for R&D Intellectual Property Management" Trappey et al. Proceedings of the 10th International Conference on Computer Supported Cooperatinve Work in Design May 3-5, 2006 p. 1-6 ISBN 1-4244-0164.
International Search Report dated Jul. 20, 2010.

(Continued)

*Primary Examiner* — Kakali Chaki
*Assistant Examiner* — Mai T Tran
(74) *Attorney, Agent, or Firm* — Rowand LLP (57) ABSTRACT

A phrase identification system and method are provided. The method comprises: identifying one or more phrase candidates in the electronic document; selecting one of the phrase candidates; numerically representing features of the selected phrase candidates to obtain a numeric feature representation associated with that phrase candidate; and inputting the numeric feature representation into a machine learning classifier, the machine learning classifier being configured to determine, based on each numeric feature representation, whether the phrase candidate associated with that numeric feature representation is a phrase.

18 Claims, 7 Drawing Sheets

(56) References Cited

OTHER PUBLICATIONS

International Search Report dated Jul. 28, 2010.
Arabic Keyphrase Extraction using Linguistic Knowledge and Machine Learning Techniques (El-shishtaway, T.A. and Al-sammak, A.K.). Publication date Apr. 22, 2009, in 2nd International Conference on Arabic Language Resources & Tools (online at http://www.elda.org/medar-conference/), 8 pages.
POS Tagger and Chunker for Tamil Language (Dhaalakshmi, V; Anand kumar, M; Rajendran, S; Soman, K P). Publication date Oct. 2009, in Proceedings of the 8th Tamil Internet Conference, Cologne, Germany, 5 pages.
POS Tagging for German: How Important is the Right Context (Steliana Ivanova, Sandra Kubler). Publication date May 2008, in Proceedings of the Sixth International Conference on Language Resources and Evaluation, LREC 2007, Marrakesh, Morocco, 4 pages.
Information Retrieval and Web Search: Keyphrase Extraction (Rada Mihalcea). Available on http://www.cse.unt.edu/~rada/CSCE5200/Lectures/KeyphraseExtraction.pptx. Accessed on Nov. 2009, 33 pages.
NLPR in TREC 2007 Blog Track (Liu Kang, Wang Gen, Han Xianpei, Zhao Jun). Publication Date 2007, in The Sixteenth Text Retrieval Conference (TRECT 2007) Proceedings, 9 pages.
An Ontology-Based Approach for Key Phrase Extraction (Chau Q. Nguyen, Tuoi T. Phan). Publication Date, Aug. 4, 2009, in Proceedings of the ACL-IJCNLP 2009 Conference Short Papers, pp. 181-184, Suntec, Singapore.
Automatic Keyphrase Extraction from Scientific Documents Using N-Gram Filtration Technique (Niraj Kumar, Kannan Srinathan). Published in 2008, in Proceeding of the eighth ACM symposium on Document Engineering, Sao Paulo, Brazil, Session: Information extraction in documents, pp. 199-208 (ISBN: 978-1-60558-081-3).
Context-Rule Model for POS Tagging (Yu-Fang Tsai, Keh-Jiann Chen). Publication date: 2003. Proceedings of the 17th Pacific Asia Conference on Language, Information and Computing, Oct. 1-3, 2003, Sentosa, Singapore, edited by Dong Hong Ji and Kim Teng Lua, pp. 146-151.
Unsupervised Information Extraction from Unstructured Ungrammatical Data Sources on the World Wide Web (Matthew Michelson and Craig A. Noblock). Publication date 2007, in International Journal of Document Analysis and Recognition (IJDAR), Special Issue on Noisy Text Analytics, 6, 13 pages.
Cipo, CA Office Action relating to Application No. 2,777,520, dated Dec. 6, 2013.
Hacohen-Kerner, Y. et al., "Automatic Extraction and Learning of Keyphrases from Scientific Articles", Computational Linguistics in Intelligent Text Processing, Lecture Notes in Computer Science, vol. 3406, 2005, Springer-Verlag Berlin Heidelberg, Jerusalem, Israel, pp. 657-669.
Knoblock, C. et al., "Special issue on noisy text analytics", International Journal of Document Analysis and Recognition (IJDAR) Dec. 2007, vol. 10, Issue 3-4, Springer-Verlag, Published online Nov. 20, 2007, pp. 127-128.
Bakus, J. et al., "Extraction of Text Phrases using Hierarchical Grammar", Advances in Artificial Intelligence Lecture Notes in Computer Science, vol. 2338, Springer-Verlag Berlin Heidelberg, 2002, pp. 319-324.
Chuang, W.T. et al., "Text Summarization by Sentence Segment Extraction Using Maching Learning Algorithms", Knowledge Discover and Data Mining. Lecture Notes in Computer Science, vol. 1805, Springer-Verlag Berlin Heidelberg, 2000, pp. 454-457.
Cipo, CA Office Action relating to Application No. 2,777,409, dated Nov. 29, 2013.

\* cited by examiner

SYSTEM AND METHOD FOR PHRASE IDENTIFICATION

CROSS-REFERENCE TO RELATED APPLICATION

This application claims the benefit of and priority to U.S. Provisional Patent Application No. 61/251,790 filed Oct. 15, 2009 under the title SYSTEM AND METHOD FOR PHRASE EXTRACTION.

The content of the above patent application is hereby expressly incorporated by reference into the detailed description hereof.

TECHNICAL FIELD

The present disclosure relates generally to document classification. More specifically, it relates to a method and system for automatically identifying phrases from machine readable documents.

BACKGROUND

Machine readable documents, such as electronic documents, may be classified or otherwise processed using data contained within such documents. In order to classify or further process the documents, it may be desirable to identify meaningful content from documents.

Such meaningful content may, in some cases, include phrases located within the documents. Phrases are groups of words which function as a single unit in the syntax of a sentence within the document. Phrases may be useful in order to identify, classify, or further process the document.

Thus, there exists a need for systems which automatically identify phrases in machine readable documents.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect, the present disclosure provides a method of identifying phrases in an electronic document comprising. The method comprises: identifying one or more phrase candidates in the electronic document; selecting one of the phrase candidates; numerically representing features of the selected phrase candidates to obtain a numeric feature representation associated with that phrase candidate; and inputting the numeric feature representation into a machine learning classifier, the machine learning classifier being configured to determine, based on each numeric feature representation, whether the phrase candidate associated with that numeric feature representation is a phrase.

In another aspect, the present disclosure provides a phrase identification system for identifying phrases in an electronic document. The phrase identification system comprises a memory and one or more processors. The processors are configured to: identify one or more phrase candidates in the electronic document; select one of the phrase candidates; numerically represent features of the selected phrase candidates to obtain a numeric feature representation associated with that phrase candidate; and input the numeric feature representation into a machine learning classifier, the machine learning classifier being configured to determine, based on each numeric feature representation, whether the phrase candidate associated with that numeric feature representation is a phrase.

Other aspects and features of the present application will become apparent to those ordinarily skilled in the art upon review of the following description of specific embodiments of the application in conjunction with the accompanying figures.

Figure 1:
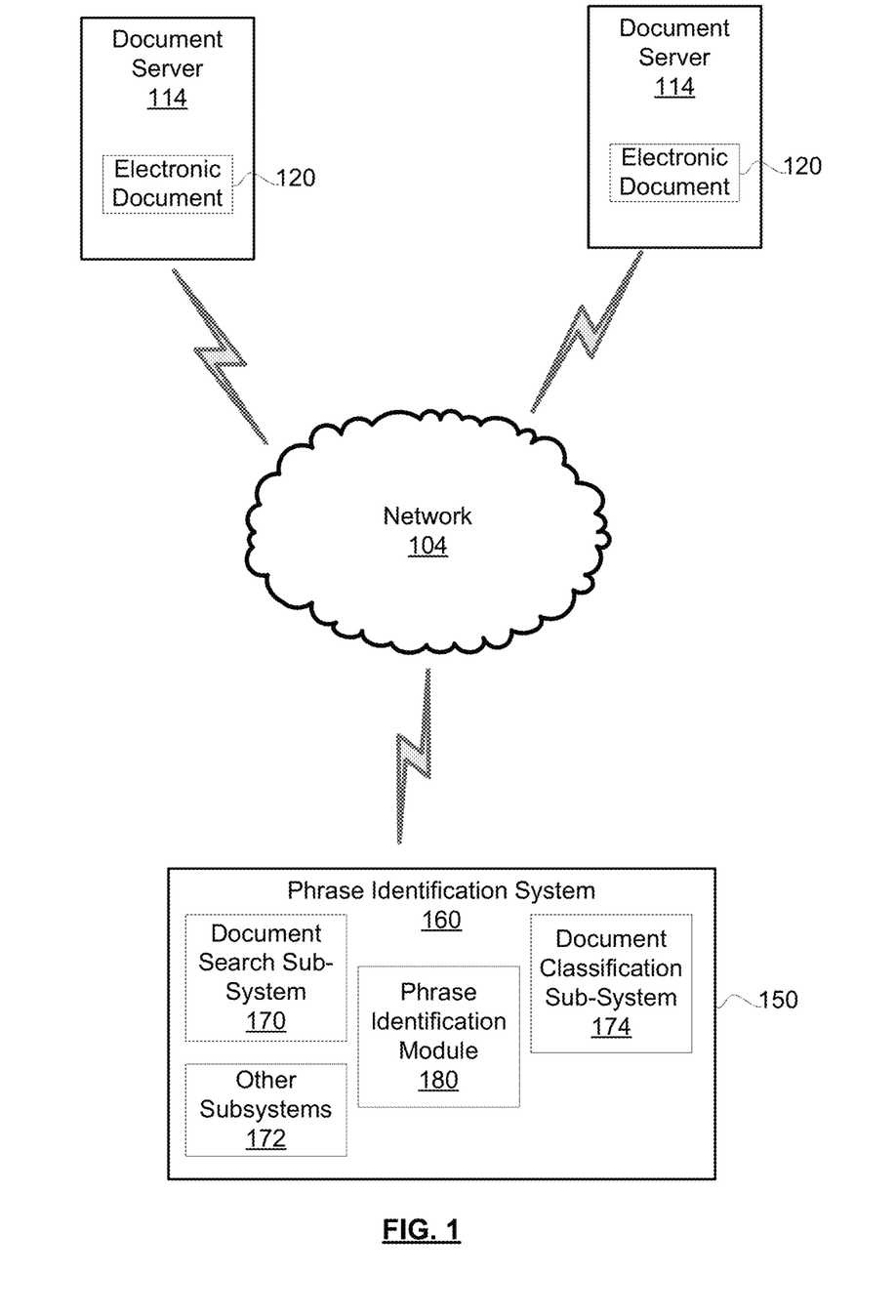
FIG. 1 shows a system diagram illustrating a possible environment in which embodiments of the present application may operate.

Reference is first made to FIG. 1, which illustrates a system diagram of a possible operating environment in which embodiments of the present disclosure may operate.

In the embodiment of FIG. 1, a phrase identification system 160 is illustrated. The phrase identification system 160 includes a phrase identification module 180 which is configured to receive machine readable documents, such as electronic documents 120, and to identify phrases in those documents 120. Phrases are groups of words which function as a single unit in the syntax of a sentence within the document 120.

The electronic documents 120 may, in various embodiments, be one or more of: blogs, micro-blogs such as Twitter™, on-line news sources, user-generated comments from web-pages, etc. Other types of electronic documents 120 are also possible. By way of example and not limitation, the documents 120 may be formatted in a Hyper-Text Markup Language ("HTML") format, a plain-text format, a portable document format ("PDF"), or in any other format which is capable of representing text. In some instances, the electronic documents 120 may be an image, such as a JPEG or Bitmap image. Other document formats are also possible.

The electronic documents 120 may be located on a plurality of document servers 114, which may be accessible through a network 104, such as the Internet. In some embodiments, the document servers 114 may be publicly and/or privately accessible web-sites which may be identified by a unique Uniform Resource Locator ("URL").

The network 104 may be a public or private network, or a combination thereof. The network 104 may be comprised of a Wireless Wide Area Network (WWAN), A Wireless Local Area Network (WLAN), the Internet, a Local Area Network (LAN), or any combination of these network types. Other types of networks are also possible and are contemplated by the present disclosure.

The phrase identification system 160 may include functionality in addition to the ability to identify phrases in electronic documents 120. For example, as illustrated in FIG. 1, in some embodiments, the phrase identification system 160 may be a document aggregation system 150. The document aggregation system 150 may be configured to search document servers 114 to locate and/or group electronic documents 120 which are related to a common subject matter.

The electronic documents 120 may, in some embodiments, be news-related documents which contain information about recent and important events. In such cases, the document aggregation system 150 may also be referred to as a news aggregation system. The news aggregation system may be configured to locate and group electronic documents 120 which are related to a common event or story.

The document aggregation system 150 may, in some embodiments, include a document search subsystem 170. The document search subsystem 170 may be used by the document aggregation system 150 to locate documents accessible through the network 104, such as the electronic documents 120 on the document servers 114. The document search subsystem 170 may be configured to search document servers 114 based on a search algorithm in order to identify electronic documents 120 matching a search criteria. By way of example, in some embodiments, the search algorithm may provide for searching of websites (or other document servers 114) of a specific category using a search keyword or phrase. For example, the document search subsystem 170 may be configured to search blogs, micro blogs, and/or online traditional news sources, etc. In some embodiments, phrases identified in electronic documents 120 by the phrase identification system 160 may be used to search similar stories on news related Internet sites, blogs, and/or social networking sites, such as Twitter™, etc.

In at least some embodiments, the document search subsystem 170 may be configured to receive phrases identified in electronic documents 120 by the phrase identification system 160 and to perform searches based on those phrases. That is, the document search subsystem 170 may be configured to attempt to identify documents which relate to the same subject matter as an electronic document 120 which has already been analyzed by the phrase identification system 160. The document search subsystem 170 may receive a phrase identified by the phrase identification module 180 and provide that phrase to a search engine, which attempts to locate other documents 120 which include the same phrase.

The search engine may, in some embodiments, be a third party search engine and may not be physically located within the document aggregation system 150. For example, a publicly accessible search engine, such as Google™ may be used.

In at least some embodiments, the document aggregation system 150 also includes a document classification subsystem 174 which associates electronic documents 120 with one or more labels. For example, the document classification subsystem 174 may associate the document 120 with a phrase identified by the phrase identification module 180. The label which is associated with the document 120 may be used to identify the subject matter of the electronic document 120. In some embodiments, a database may be used to maintain the association between documents 120 and labels.

The document aggregation system 150 may include other systems, subsystems 172, or modules not specifically described above. By way of example and not limitation, the document aggregation system 150 may, in some embodiments, include a ranking subsystem which ranks documents 120 or the subject of documents 120 based on frequency of use or frequency of occurrence. For example, the subjects of a plurality of documents 120 may be ranked by determining the frequency of occurrence of each label (such as a phrase) associated with documents 120. The rank may indicate, in at least some embodiments, how topical the subject matter associated with that label is.

In at least some embodiments, the document aggregation system 150 may include a web-interface subsystem (not shown) for automatically generating web pages which provide links for accessing the documents 120 on the document servers 114 and other information about the documents 120. The other information may include a machine-generated summary of the contents of the document, and a rank of the subject matter of the document as determined by the ranking subsystem (not shown). The web pages which are generated by the web-interface subsystem may group electronic documents 120 by subject matter and/or by phrases which are used in the electronic documents 120.

By way of further example, the other subsystems 172 may also include a power subsystem for providing electrical power to electrical components of the document aggregation system 150 and a communication subsystem for communicating with the document servers 114 through the network 104.

It will be appreciated that the phrase identification system 160 (and/or the document aggregation system 150) may include more or less subsystems and/or functions than are discussed herein. It will also be appreciated that the functions provided by any set of subsystems may be provided by a single system and that these functions are not, necessarily, logically or physically separated into different subsystems.

Furthermore, while FIG. 1 illustrates one possible embodiment in which the phrase identification system 160 may operate, (i.e. where the phrase identification system 160 is a document aggregation system 150) it will be appreciated that the phrase identification system 160 may be employed in any system in which it may be useful to employ a machine in order to identify phrases in machine readable documents (such as the electronic documents 120).

Accordingly, the term phrase identification system 160, as used herein, is intended to include stand alone phrase identification systems which are not, necessarily, part of a larger system, and also phrase identification sub-systems which are part of a larger system (which may be the same or different than the document aggregation system 150 of FIG. 1). The term phrase identification system 160 is, therefore, intended to include any systems in which the phrase identification methods described herein are included.

In at least some embodiments, the phrase identification module 180, the document search sub-system 170, the document classification subsystem 174 and/or any of the other subsystems 172 may be implemented, in whole or in part, by way of a processor 240 which is configured to execute software modules 260 stored in memory 250. A block diagram of one such example phrase identification system 160, is illustrated in FIG. 2.

Figure 2:
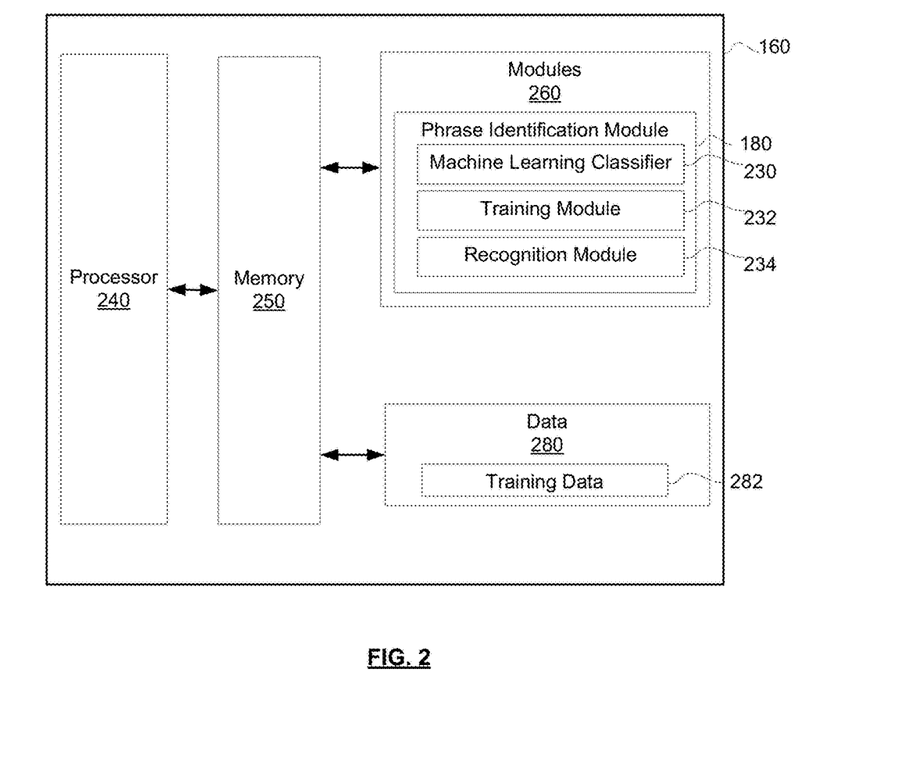
FIG. 2 shows a block diagram of a phrase identification system in accordance with an embodiment of the present disclosure.

In the embodiment of FIG. 2, the phrase identification system 160 includes a controller comprising one or more processor 240 which controls the overall operation of the phrase identification system 160. The phrase identification system 160 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules 260 stored on the memory 250. The software modules may be comprised of, for example, a phrase identification module 180 which is configured to identify one or more phrases which may be included in a machine readable document, such as the electronic document 120 of FIG. 1.

The phrase identification module 180 receives a machine readable document, such as the electronic documents 120 of FIG. 1, as an input and identifies phrases in those documents 120. The electronic documents 120 may be stored locally in memory 250 of the phrase identification system 160 or may be retrieved from a remote location, such as the document servers 114 of FIG. 1.

The phrase extraction system 160 may be comprised of a training module 232 and a recognition module 234. The training module 232 may be an offline process (i.e. network 104 connectivity may not be required), which is used to train a machine-learning classifier 230 to recognize phrases in electronic documents 120. That is, the training modules may rely on locally stored training data 282 which may be stored in a data 280 area of the memory 250.

It will be appreciated that, in some embodiments, the training data 282 may be stored remotely; for example, on a document server 114. In such embodiments, the training module 232 may be an online process which may rely on network 104 (FIG. 1) connectivity.

The training data 282 is comprised of one or more electronic documents for which phrases have already been identified. The phrases may have been previously identified, for example, by manual parsing of an electronic document. For example, prior to training, a set of electronic documents 120 may be scanned by an operator in order to identify phrases within the electronic document 120. The phrases which are identified may be labelled as a phrase within the training data 282. That is, an annotation may be associated with a group of words in an electronic document 120 in order to indicate that the group of words has been identified as a phrase. Such an annotation may be referred to as a phrase label.

As will be explained in greater detail below, the training data 282 is used to train a machine learning classifier 230 to recognize phrases. It will be appreciated that the accuracy of the machine learning classifier 230 following its training will depend, at least in part, on the volume of training data 282 used to train the machine learning classifier 230. Accordingly, the training data 282 will typically comprise one or more electronic documents 120 which contain a large number of labelled phrases.

By way of example, in at least one embodiment, a phrase label may be comprised of square brackets. An example of such an electronic document 120 may include:

Both [Westwood Brick] and [Westwood Group] are based in Boston.

In this example, the text enclosed within brackets is a labelled phrase.

Accordingly, the training data 282 may be comprised of an electronic document 120 which contains or is associated with phrase labels. The phrase labels indicate the groups of words in the document 120 which are to be considered a phrase.

The machine learning classifier 230 may be of various types. By way of example, the machine learning classifier 230 may be a support vector machine, a naïve bayian classifier, an ADA-boosting classifier or a K nearest neighbourhood classifier.

The recognition module 234 of the phrase identification module 180 may perform an online process which uses the machine learning classifier 230 trained using the training module 232. That is, recognition may be performed on electronic documents 120 (FIG. 1) which are located on remote document servers 114 (FIG. 1). Such remote document servers 114 may be accessed via the network 114.

It will be appreciated that, in some embodiments, the electronic documents 120 may be stored locally; for example, in memory 250. In such embodiments, the recognition module 234 may be an offline process.

The specific functions provided by the phrase identification module 180 will be discussed below in greater detail with respect to FIGS. 3 to 7.

It will be appreciated that the phrase extraction system 160 may be comprised of other features, components, or subsystems apart from those specifically discussed herein. By way of example and not limitation, the phrase extraction system 160 will include a power subsystem which interfaces with a power source, for providing electrical power to the phrase extraction system 160 and its components. By way of further example, the phrase extraction system 160 may include a display subsystem (not shown) for interfacing with a display, such as a computer monitor and, in at least some embodiments, an input subsystem (not shown) for interfacing with an input device. The input device may, for example, include an alphanumeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, the training module 232 may be separated from the phrase identification module 180.

Figure 3:
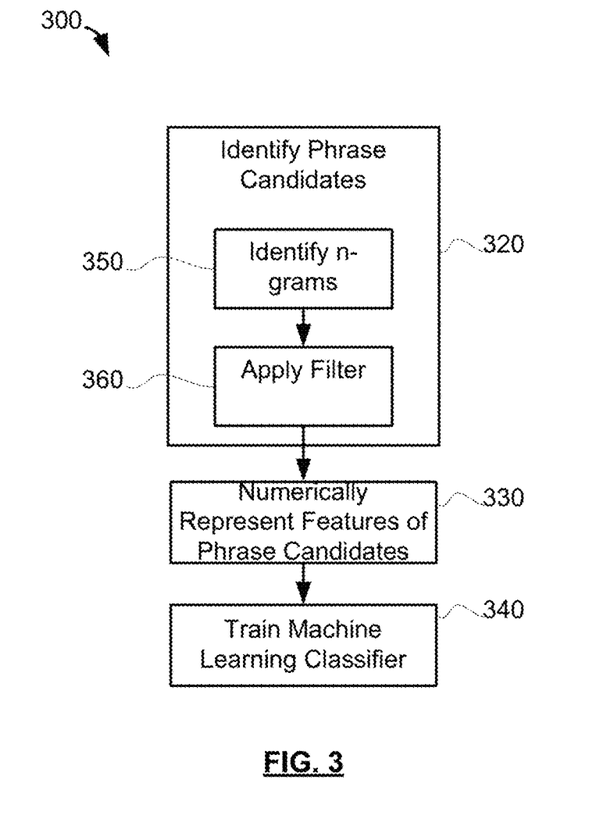
FIG. 3 shows a flowchart of a process for training a machine learning classifier to recognize phrases in an electronic document in accordance with an embodiment of the present disclosure.

Referring now to FIG. 3, a process 300 for training a machine learning classifier to recognize phrases in an electronic document 120 (FIG. 1) is illustrated in flowchart form. The process 300 includes steps or operations which may be performed by the phrase extraction system 160 of FIGS. 1 and/or 2. More particularly, the phrase identification module 180 and/or the training module 232 of FIG. 2 may be configured to perform the process 300 of FIG. 3. That is, the phrase identification module 180 and/or the training module 232 may contain instructions for causing the processor 240 to execute the process 300 of FIG. 3.

The process 300 of FIG. 3 receives, as input, the training data 282 (FIG. 2), which may be stored in the memory 250. The process 300 produces, as an output, a machine-learning classifier 230 (FIG. 2).

In the embodiment shown, training is comprised of the following steps: phrase candidate creation 320; numeric representation of features of phrase candidates 330; and machine-learning classifier training 340.

First, at step 320, phrase candidates are identified from an electronic document 120 in the training data 282.

A phrase candidate is, not necessarily, a phrase in the electronic document 120. As will be explained in greater detail below, phrase candidates are groups of words which are identified for further analysis in order to determine whether the phrase candidate is, in fact, a phrase.

In at least some embodiments, the step 320 of identifying phrase candidates includes a step 350 of identifying world level n-grams in the document 120 of the training data 282.

An n-gram is a subsequence of n items from a given sequence. The world level n-grams are, therefore, a subsequence of n words in the document 120.

In at least some embodiments, the step 350 of identifying world level n-grams in the document 120, includes identifying n-grams in the electronic document 120 which are of a predetermined size. The predetermined size may be specified by one or more threshold. For example, n-grams may be identified if they are of a size that is greater than a first predetermined threshold and/or less than a second predetermined threshold.

For example, in some embodiments, the step 350 of identifying word level n-grams includes identifying n-grams in the electronic document which are greater than or equal to two words (i.e. n>=2). That is, sequences of words in the electronic document 120 which are bi-grams or greater may be identified as possible phrase candidates.

By way of example and not limitation, in the example document 120 discussed above (i.e. "Both Westwood Brick and Westwood Group are based in Boston."), the following are examples of some of the possible phrase candidates:

1) Both Westwood, Westwood Brick, Brick and, and Westwood, Westwood Group, etc. (These are n-grams with a size of two words)
2) Both Westwood Brick, Westwood Brick and, etc. (These are n-grams of a size of three words)

In at least some embodiments, the step 350 of identifying word level n-grams in the document includes identifying n-grams which are less than a second predetermined threshold. By way of example, in some embodiments, the second predetermined threshold may be five words.

In some embodiments, the n-grams identified in step 350 may be selected as phrase candidates (and the process 300 may proceed directly to step 330). In other embodiments, some of the n-grams which are identified in step 350 may be excluded from selection as a phrase candidate by applying a rule based filter to the n-grams identified at step 350. That is, the step 320 of identifying phrase candidates may, in some embodiments, include a step 360 of applying a rule-based filter to filter out some of the n-grams which had been identified at step 350.

For example, in some embodiments, the rule based filter may include a rule to filter out all bi-grams (i.e. n-grams with a size of 2 words) in which the second word in the n-gram is the word "and." In some embodiments, the rule-based filter may include a rule to filter out all n-grams in which each word in the n-gram is of a size that is less than a predetermined number of characters. For example, the rule-based filter may be configured to filter out all n-grams in which each word in the n-gram is of a size that is less than two characters. Other rules may be applied in other embodiments.

In embodiments which include a rule based filter at step 360, the n-grams which are identified at step 350 and which are not filtered out at step 360 may be identified as phrase candidates.

After phrase candidates have been identified, at step 330, features of the phrase candidates may be numerically represented in order to obtain a numeric feature representation associated with the phrase candidates identified at step 320.

The numeric feature representation numerically represents one or more features of the phrase candidate. The numeric feature representation may be of a vector format. Features that are represented by the numeric feature representation may include, for example, any one or more of the following: one or more part-of-speech associated with one or more words of the phrase candidate (i.e. whether the word is a noun, verb, etc.), one or more part-of-speech associated with words that are adjacent to the words of the phrase candidate (these adjacent words may be referred to as context words), one or more unique identifier associated with each word in the phrase candidate, one or more unique identifier associated with words that are adjacent to the words of the phrase candidate, whether words in the phrase candidate or context words satisfy one or more rules, etc.

The numeric feature representation and the step 330 of numerically representing features of the phrase candidates will be discussed in greater detail below with respect to FIGS. 5 and 7.

Next, at step 340, a machine learning classifier 230 (FIG. 2) is trained using the numeric feature representations obtained at step 330 and the phrase labels associated with the document 120 in the training data 282. It will be appreciated that the accuracy of the machine learning classifier 230 in identifying phrases from phrase candidates will depend, at least in part, on the volume of training data 282 used to train the machine learning classifier 230. Accordingly, the process 300 of FIG. 3 may, in at least some embodiments, be repeated for a plurality of documents in the training data 282.

The machine learning classifier 230 may be of various types. By way of example, the machine learning classifier 230 may be a support vector machine, a naïve bayian classifier, an ADA-boosting classifier or a K nearest neighbourhood classifier.

After the machine learning classifier 230 (FIG. 2) has been trained (for example, according to the process 300 of FIG. 3), the machine learning classifier 230 may be used by the recognition module 234 to identify phrases in electronic documents 120 which do not include phrase labels indicating the sequences of words that are considered phrases. That is, the machine learning classifier 230 may be used to recognize phrases in electronic documents 120, such as the electronic documents 120 obtained from remote document servers 114 (FIG. 1). The recognition module 234 may receive, as an input, an electronic document 120 which does not have phrase labels associated therewith and may produce, as an output, phrases.

Figure 4:
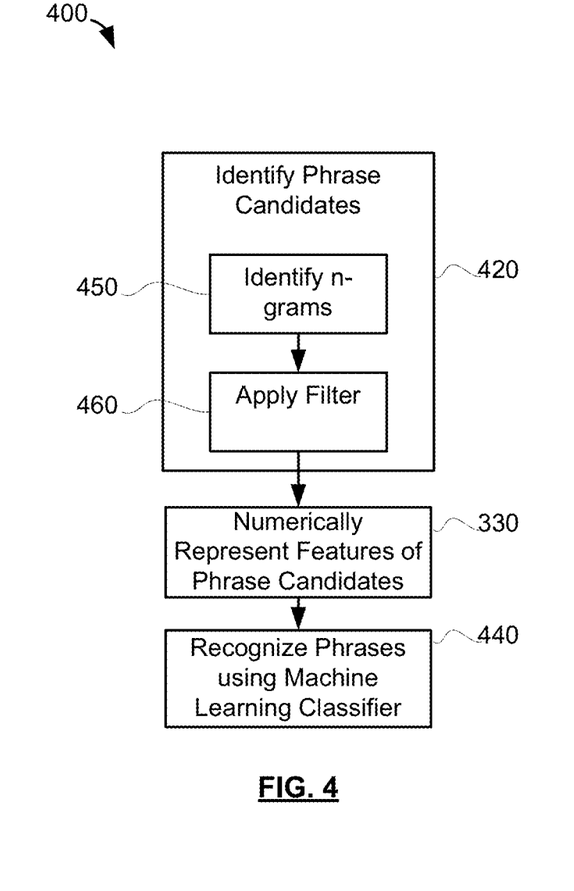
FIG. 4 shows a flowchart of a process for recognizing phrases in an electronic document using a machine learning classifier in accordance with an embodiment of the present disclosure.

Referring now to FIG. 4, a process 400 for recognizing phrases in an electronic document 120 (FIG. 1) using a machine learning classifier 230 (FIG. 2) is illustrated in flowchart form. The process 400 includes steps or operations which may be performed by the phrase extraction system 160 of FIGS. 1 and/or 2. More particularly, the phrase identification module 180 and/or the recognition module 234 of FIG. 2 may be configured to perform the process 400 of FIG. 4. That is, the phrase identification module 180 and/or the recognition module 234 may contain instructions for causing the processor 240 to execute the process 400 of FIG. 4.

In the embodiment shown, phrase recognition is comprised of the following steps: phrase candidate creation 420; numeric representation of features of phrase candidates 330; and recognition 440 using the machine learning classifier 230 (FIG. 2).

First, at step 420, phrase candidates are identified from an electronic document 120 which is received by the recognition module 234.

The step 420 of identifying phrase candidates in the process 400 of FIG. 4 is similar to the step 320 of identifying phrase candidates in the process 300 of FIG. 3, except in that the electronic document 120 to which the step 420 of identifying phrase candidates in FIG. 4 is applied does not, generally, have any previously existing phrase labels. That is, the electronic document 120 received by the recognition module 234 in the process 400 of FIG. 4 differs from the electronic document 120 received by the training module 232 in the process 300 of FIG. 3 in that the electronic document 120 received by the recognition module 234 does not have any associated phrase labels indicating the phrases in the electronic document 120.

In at least some embodiments, the step 420 of identifying phrase candidates includes a step 450 of identifying world level n-grams in the electronic document 120.

In at least some embodiments, the step 450 of identifying world level n-grams in the electronic document 120, includes identifying n-grams in the electronic document 120 which are of a predetermined size. The predetermined size may be specified by one or more threshold. For example, n-grams may be identified if they are of a size that is greater than a first predetermined threshold and/or less than a second predetermined threshold.

For example, in some embodiments, the step 450 of identifying word level n-grams includes identifying n-grams in the electronic document 120 which are greater than or equal to two words (i.e. n>=2). That is, sequences of words in the electronic document 120 which are bi-grams or greater may be identified as possible phrase candidates.

By way of example and not limitation, in the example document 120 discussed above (i.e. Both Westwood Brick and Westwood Group are based in Boston.), the following are examples of some of the possible phrase candidates:
3) Both Westwood, Westwood Brick, Brick and, and Westwood, Westwood Group, etc. (These are n-grams with a size of two words)
4) Both Westwood Brick, Westwood Brick and, etc. (These are n-grams of a size of three words)

In at least some embodiments, the step 450 of identifying, as phrase candidates, world level n-grams in the document, includes identifying n-grams which are less than a second predetermined threshold. By way of example, in some embodiments, the second predetermined threshold may be five words.

In some embodiments, the n-grams identified in step 450 may be selected as phrase candidates (in such cases, the process 400 may proceed directly to step 330). In other embodiments, some of the n-grams which are identified in step 450 may be excluded from selection as a phrase candidate by applying a rule based filter to the n-grams identified at step 450. That is, the step 420 of identifying phrase candidates may, in some embodiments, include a step 460 of applying a rule-based filter to filter out some of the n-grams which had been identified at step 450.

For example, in some embodiments, the rule based filter may include a rule to filter out all bi-grams (i.e. n-grams with a size of 2 words) in which the second word in the n-gram is the word "and." In some embodiments, the rule-based filter may include a rule to filter out all n-grams in which each word in the n-gram is of a size that is less than a predetermined number of characters. For example, the rule-based filter may be configured to filter out all n-grams in which each word in the n-gram is of a size that is less than two characters. Other rules may be applied in other embodiments.

In embodiments which include a rule based filter at step 460, the n-grams which are identified at step 450 and which are not filtered out at step 460 by the rule based filter may be identified as phrase candidates.

After phrase candidates have been identified, at step 330, features of the phrase candidates may be numerically represented in order to obtain a numeric feature representation associated with the phrase candidates identified at step 320.

The step 330 of FIG. 4 may correspond to the step 330 of FIG. 3. As noted previously with respect to the discussion of FIG. 3, the numeric feature representation and the step 330 of numerically representing features of the phrase candidates will be discussed in greater detail below with respect to FIGS. 5 and 7.

Next, at step 440, the machine learning classifier 230 may be used to recognize phrases in the electronic document 120. That is, the numeric feature representation obtained at step 330 of FIG. 4 may be input to the machine learning classifier 230 to classify each phrase candidate as either a "phrase" or a "non-hrase" (or some other equivalent label). That is, at step 440, the machine learning classifier 230 is used to identify phrases in the electronic document 120.

Figure 5:
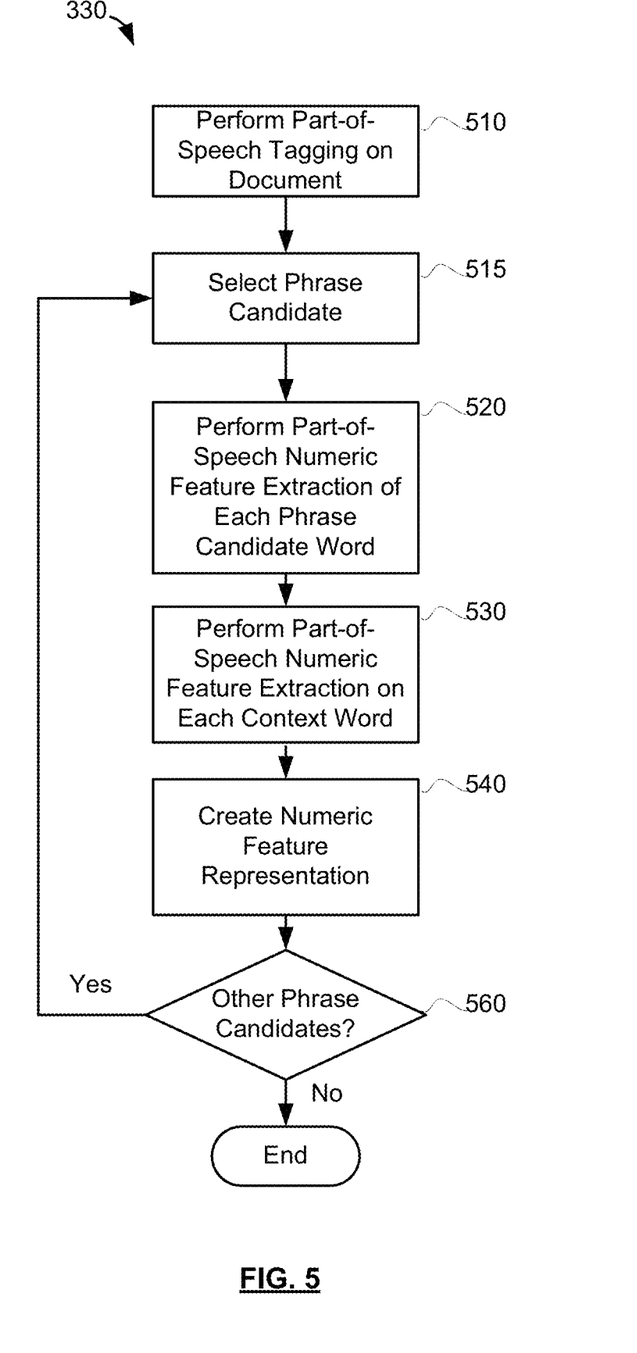
FIG. 5 shows a process for obtaining a numeric feature representation for a phrase candidate in accordance with an embodiment of the present disclosure.

Referring now to FIG. 5, an embodiment of the step 330 of numerically recognizing features of one or more phrase candidates, which was briefly discussed above with reference to FIGS. 3 and 4, will be discussed in greater detail. A flowchart of an embodiment of the step 330 is illustrated.

In the step 330 of FIG. 5, a numeric feature representation of a phrase candidate is created based on part-of-speech tagging of the words in the phrase candidate. The step 330 includes steps or operations which may be performed by the phrase extraction system 160 of FIGS. 1 and/or 2. More particularly, the phrase identification module 180 and/or the training module 232 and/or the recognition module 234 of FIG. 2 may be configured to perform the step 330 of FIG. 5. That is, the phrase identification module 180 and/or the recognition module 234 and/or the training module 232 may contain instructions for causing the processor 240 to execute the step 330 of FIG. 5.

First, at step 510, at least some of the words contained in the electronic document 120 may be automatically analyzed and tagged by the phrase identification system 160 (FIG. 2) using part-of-speech tagging. Part-of-speech tagging is the process of marking up the words in the electronic document 120 based on the word's definition and/or context. By way of example, part-of-speech tagging may recognize whether a word is one of: a cardinal number, a determiner, an existential there, a foreign word, a preposition or subordinating conjunction, and adjective, an adjective comparative, an adjective superlative, a list item marker, a modal, a noun (and/or the type of noun i.e. proper noun, plural, singular, etc.), a predeterminer, a possessive ending, a personal pronoun, a possessive pronoun, an adverb, an adverb comparative, an adverb superlative, a particle, a symbol, an interjection, a verb (and/or the type of verb i.e. base form, past tense, gerund, past participle, non-3rd person singular present, 3rd person singular present), a wh-deterimer, a wh-pronoun, and/or whether the word is a contains a specific type of punctuation (i.e. a numbers sign (#), a dollar sign ($), a quotation mark ("), a parenthesis, etc.). It will be appreciated that these examples are merely illustrative and that other part-of-speech tags are also possible.

By way of example and not limitation, using the exemplary document referred to above, an example of a tagged document may be:
Both/DT Westwood/NNP Brick/NNP and/CC Westwood/NNP Group/NNP are/VBP based/VBN in/IN Boston/NNP
where DT represents a word that is a determiner; NNP represents a singular proper noun; CC represents a coordinating conjunction; VBP represents a Verb, non-3rd person singular present; VBN represents a verb, past participle; IN represents a preposition or subordinating conjunction.

In the example shown, the label following each slash (/) is the part-of-speech tag of that word.

By way of further example, exemplary tags associated with various parts-of-speech which may be used in some embodiments are as follows:

CC=Coordinating conjunction; CD=Cardinal number; DT=Determiner; EX=Existential there; FW=Foreign word; IN=Preposition or subordinating conjunction; JJ=Adjective; JJR=Adjective, comparative; JJS=Adjective, superlative; LS=List item marker; MD=Modal; NN=Noun, singular or mass; NNS=Noun, plural; NNP=Proper noun, singular; NNPS=Proper noun, plural; PDT=Predeterminer; POS=Possessive ending; PRP=Personal pronoun; PRP_=Possessive pronoun; RB=Adverb; RBR=Adverb, comparative; RBS=Adverb, superlative; RP=Particle; SYM=Symbol; TO=to; UH=Interjection; VB=Verb, base form; VBD=Verb, past tense; VBG=Verb, gerund or present participle; VBN=Verb, past participle; VBP=Verb, non-3rd person singular present; VBZ=Verb, 3rd person singular present; WDT=Wh-determiner; WP=Wh-pronoun; WP_=Possessive wh-pronoun; WRB=Wh-adverb; PUNC_SHARP=#; PUNC_DOLLAR=$; PUNC_LASTQUOTE="; PUNC_FIRSTPAREN=(; PUNC_LASTPAREN=); PUNC_COMMA=,; PUNC_STOP=.; PUNC_SEMICOMMA=:; PUNC_FIRSTQUOTE='; OTHER=others It will, however, be appreciated that the specific tags used and/or the parts-of-speech which are identified may deviate from those specifically identified above. It will also be appreciated that, while FIG. 5 illustrates an embodiment in which part-of-speech tagging is performed on the complete electronic document 120, in other embodiments part of speech tagging may only be performed on words in phrase candidates or on words which are located near phrase candidates in the electronic document 120.

It will be appreciated that step 510 may be performed on the entire electronic document 120 or, in at least some embodiments, it may be performed on a single phrase candidate. In the embodiment shown, in order to realize a processing efficiency, step 510 is performed on the complete electronic document 120 in order to perform part of speech tagging on all words in the document 120 in a single pass. However, in other embodiments, part of speech tagging may be performed on a single phrase candidate. In other embodiments, step 510 may be performed on a phrase candidate and words which are adjacent to the phrase candidate.

Next, at step 515, one of the phrase candidates in the document 120 may be selected. In the steps that follow step 515, a numeric feature representation is created for the selected phrase candidate. The phrase candidate selected at the first instance of step 515 may be the first phrase candidate in the document 120. At the second instance of step 515 (i.e. following the decision at step 560), the second phrase candidate in the document 120 may be selected. That is, during each iteration of step 515, a next phrase candidate may be selected. The next phrase candidate is the phrase candidate in the document 120 that is adjacent to the phrase candidate selected during the last iteration of step 515.

Next, at step 520, numeric feature extraction is performed for each word in the selected phrase candidate. The step 520 may rely on a predetermined part-of-speech map which associates each part-of-speech which the system is configured to recognize at step 510 with a unique number. The unique number is, in at least some embodiments, an integer number. This predetermined part-of-speech map may, for example, be stored in the memory 250 of FIG. 2.

Using the example illustrated above, an example part-of-speech map which maps parts-of-speech (and/or part-of-speech tags) to numbers may be as follows:

CC=Coordinating conjunction=1; CD=Cardinal number=2; DT=Determiner=3; EX=Existential there=4; FW=Foreign word=5; IN=Preposition or subordinating conjunction=6; JJ=Adjective=7; JJR=Adjective, comparative=8; JJS=Adjective, superlative=9; LS=List item marker=10; MD=Modal=11; NN=Noun, singular or mass=12; NNS=Noun, plural=13; NNP=Proper noun, singular=14; NNPS=Proper noun=15, plural; PDT=Predeterminer=16; POS=Possessive ending=17; PRP=Personal pronoun=18; PRP_=Possessive pronoun=19; RB=Adverb=20; RBR=Adverb, comparative=21; RBS=Adverb, superlative=22; RP=Particle=23; SYM=Symbol=24; TO=to=25; UH=Interjection=26; VB=Verb, base form=27; VBD=Verb, past tense=28; VBG=Verb, gerund or present participle=29; VBN=Verb, past participle=30; VBP=Verb, non-3rd person singular present=31; VBZ=Verb, 3rd person singular present=32; WDT=Wh-determiner=33; WP=Wh-pronoun=34; WP_=Possessive wh-pronoun=35; WRB=Wh-adverb=36; PUNC_SHARP=#=37; PUNC_DOLLAR=$=38; PUNC_LASTQUOTE="39; PUNC_FIRSTPAREN=(=40; PUNC_LASTPAREN=)=41; PUNC_COMMA=, =42; PUNC_STOP=.=43; PUNC_SEMICOMMA=: =44; PUNC_FIRSTQUOTE=.=45; OTHER=others=46

It will, however, be appreciated that the part-of-speech map provided above is merely illustrative and that other mappings are also possible.

At step 520, the part-of-speech map may be used to identify one or more numbers corresponding to the part-of-speech of each word in the currently selected phrase candidate.

Using the examples provided above, for the bi-gram phrase candidate "Both Westwood", the first word of the bi-gram (i.e. "Both"), is a determiner part-of-speech. Accordingly, using the map provided above, this word is associated, at step 520, with the number three (3) to represent its part-of-speech.

In at least some embodiments, the number associated with the part-of-speech may be represented as a vector. For example, the number may be represented as a binary numeric vector of a dimension that is equal to the highest number included in the part-of-speech map and/or that is equal to the number of part-of-speech types that are included in the part-of-speech map. In the example part-of-speech map provided above, the vector may be a forty-six (46) dimension binary vector since there are forty-six possible part-of-speech tags. Each number may have a corresponding predetermined position in the vector.

In such an embodiment, the vector for the number (3) corresponding to the part-of-speech tag for the word "Both" in the bi-gram "Both Westwood" in the example discussed above could be represented as:

00100000000000000000000000000000000000000000

000000

That is, the third bit position in the vector in the example given above corresponds to the part-of-speech tag associated with the integer three.

Although in the example given above, the dimension of the vector corresponds directly to the number of possible partsof-speech tags which the system is configured to recognize, other vectors of other dimension could be used.

Next, at step 530, in at least some embodiments, numeric feature extraction of context words is performed. That is, at step 530, numeric features of context words are extracted. Context words are words that are adjacent to the phrase candidate for which a numeric feature representation is currently being created. Context words may, in various embodiments, include left context words, right context words, or both. Context words must, generally, be in the same sentence as the phrase candidate being evaluated.

At step 530, the part-of-speech map may be used to identify one or more numbers corresponding to the part-of-speech of each context word.

A context word threshold may be pre-defined in order to determine how many context words feature extraction should be performed upon. For example, in some embodiments, the context word threshold may be three words. In such cases, at step 530, a number is determined that corresponds to the part-of-speech tag of each of the three words located on each side of the phrase candidate (i.e. the three words to the left and the three words to the right).

Using the example document discussed above (i.e. "Both Westwood Brick and Westwood Group are based in Boston."), if the maximal length is three words, the phrase "Both Westwood" does not have any left context words and the right context words are: "Brick", "and", "Westwood". "Westwood Group" has left context words "and", "Brick", "Westwood" and right context words "are", "based", "in".

Accordingly, at step 530, using the method described in step 520, numeric part-of-speech features for each context word may be extracted. That is, a vector which represents the part-of-speech for context words of a phrase candidate may be determined. In at least some embodiments, this vector may be determined in the manner discussed above with respect to step 520. That is, in at least some embodiments, each part-of-speech tag is associated with a separate bit position in a vector. That bit position may correspond to an integer associated with the part-of-speech tag in the part-of-speech map.

Next, at step 540, a numeric feature representation for the currently selected phrase candidate is created. The numeric feature representation is created based on the numbers identified at step 520 and/or step 530.

In some embodiments, the numeric feature representation may be created by concatenating (or otherwise joining) together the vectors created at step 520 for each word of a phrase candidate and/or the vectors created at step 530 for each context word of the phrase candidate in order to create a larger vector for the phrase candidate. This larger vector numerically represents the part-of-speech of the selected phrase candidate and possibly the part-of-speech of the context words of that phrase candidate. That is, all of the feature vectors created in the above feature extraction steps for a phrase candidate are put together in order to create one vector for the phrase candidate.

In order to ensure that information is consistently placed in a standard portion of a vector, if one or more context word does not exist, the portion of the vector corresponding to that context word may be populated with zeros, or another value which is used to identify the absence of a context word. Ensuring consistent placement of information helps to ensure the numeric feature representation is suitable for reading and computing by the machine learning classifier 230 (FIG. 2).

Accordingly, for an n-gram phrase candidate with M left context words and M right context words, a binary vector of the type described above may have a dimension of POS_SIZE*(n+M+M), where POS_SIZE represents the number of part-of-speech tags included in the part-of-speech map (i.e. POS_SIZE=46 in the example considered above).

Next, at step 560, a determination may be made as to whether there are any additional phrase candidates in the document 120. If there are additional phrase candidates, numeric feature representations may be obtained for each of these phrase candidates in the manner described above with reference to steps 520, 530 and 540. If there are not any additional phrase candidates in the document 120, step 330 may end.

Figure 6:
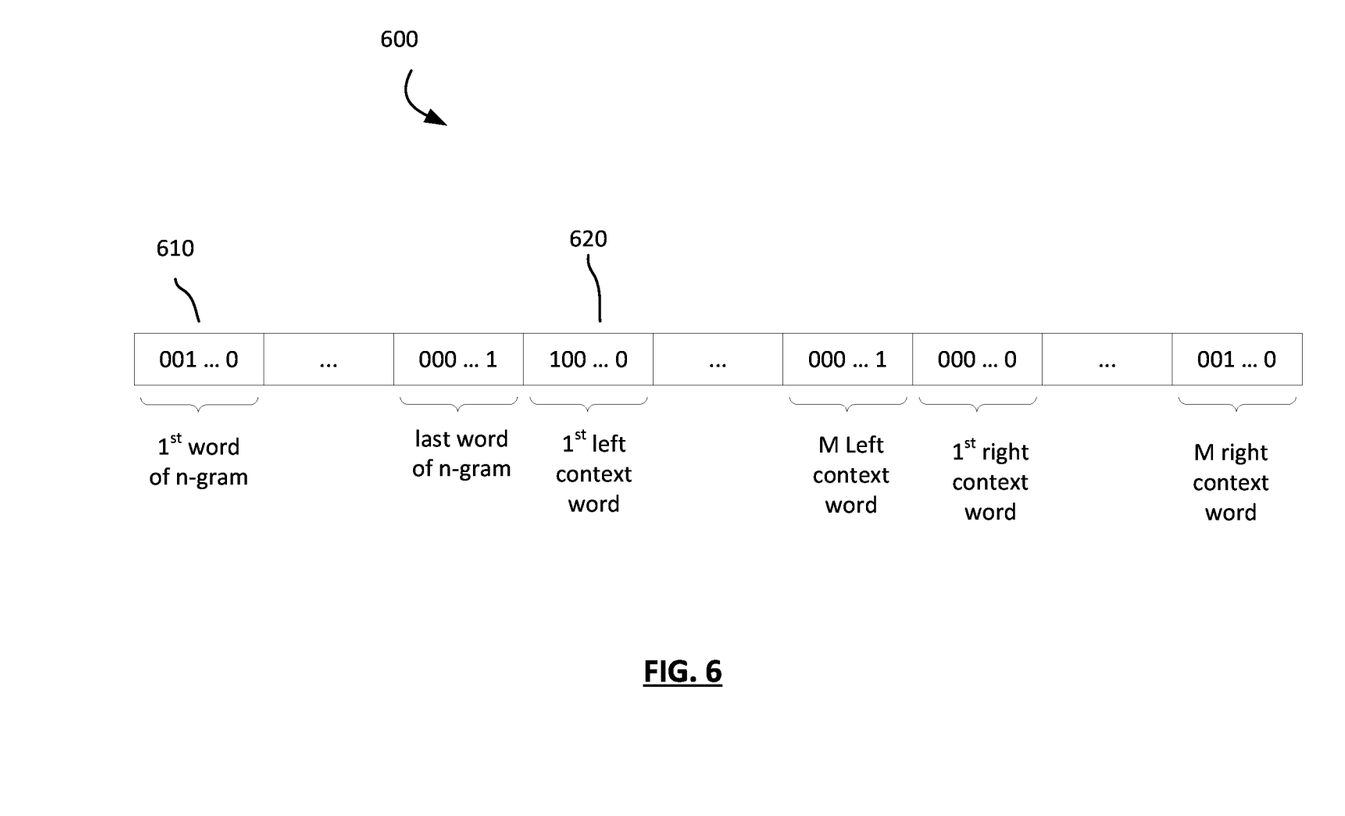
FIG. 6 shows an example of a numeric feature representation of a phrase candidate in accordance with an embodiment of the present disclosure.

Referring now to FIG. 6, an example of a numeric feature representation 600 of a phrase candidate is illustrated. The numeric feature representation 600 is a feature vector, such as the feature vector produced at step 540 of FIG. 5. The feature vector shown in FIG. 6 is an example data structure of numeric feature vector of an n-gram phrase candidate. The numeric feature representation 600 includes vectors 610 (or other numeric features) representing the part-of-speech of each word of the phrase candidate, and vectors representing the part-of-speech of one or more context word of the phrase candidate.

The numeric feature representation 600 is suitable for machine reading and computing.

Figure 7:
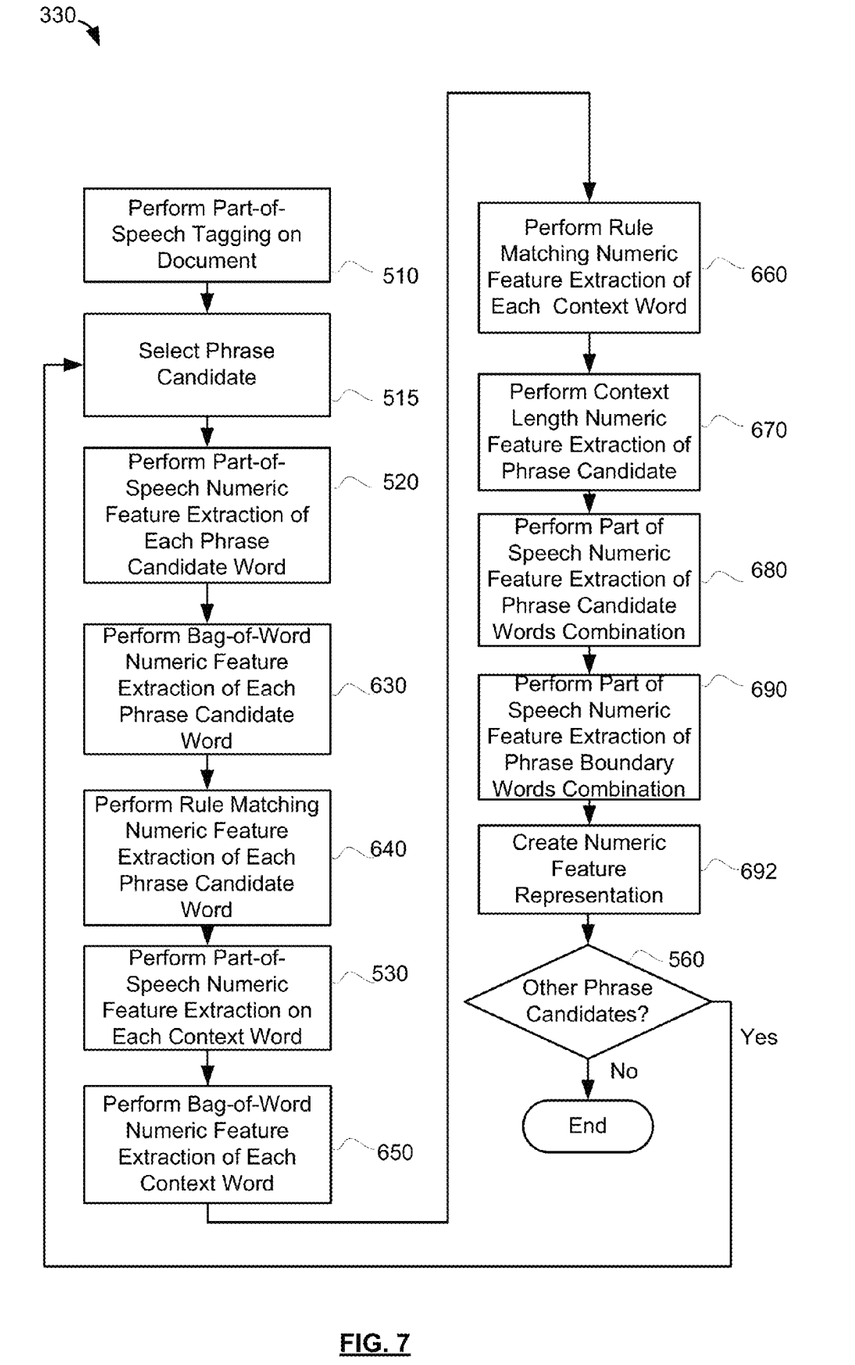
FIG. 7 shows a process for obtaining a numeric feature representation for a phrase candidate in accordance with another embodiment of the present disclosure.

Referring now to FIG. 7, further embodiments of the step 330 of numerically recognizing features of one or more phrase candidates, which was briefly discussed above with reference to FIGS. 3 and 4 will be discussed in greater detail. A flowchart of an embodiment of the step 330 is illustrated.

In the step 330 of FIG. 7, a numeric feature representation of a phrase candidate is created based on part-of-speech tagging of the words in the phrase candidate. The step 330 includes steps or operations which may be performed by the phrase extraction system 160 of FIGS. 1 and/or 2. More particularly, the phrase identification module 180 and/or the training module 232 and/or the recognition module 234 of FIG. 2 may be configured to perform the step 330 of FIG. 7. That is, the phrase identification module 180 and/or the recognition module 234 and/or the training module 232 may contain instructions for causing the processor 240 to execute the step 330 of FIG. 7.

The embodiment of FIG. 7 differs from the embodiment in FIG. 5 in that the embodiment of FIG. 7 includes additional steps which are not discussed with respect to FIG. 5. These additional steps extract additional features from the electronic document 120.

As with the embodiment of FIG. 5, the embodiment of FIG. 7 may include a step 510 in which the words contained in the electronic document 120 may be tagged using part-of-speech tagging. It will be appreciated that step 510 may be performed on the entire electronic document 120 or, in at least some embodiments, it may be performed on a single phrase candidate. In the embodiment shown, in order to realize a processing efficiency, step 510 is performed on the complete electronic document 120 in order to perform part of speech tagging on all words in the document 120 in a single pass. However, in other embodiments, part of speech tagging may be performed on a single phrase candidate. In other embodiments, step 510 may be performed on a phrase candidate and words which are adjacent to the phrase candidate.

Next, at step 515, one of the phrase candidates in the document 120 may be selected. In the steps that follow step 515, a numeric feature representation is created for the selected phrase candidate. The phrase candidate selected at the first instance of step 515 may be the first phrase candidate in the document 120. At the second instance of step 515 (i.e. following the decision at step 560), the second phrase candidate in the document 120 may be selected. That is, during each iteration of step 515, a next phrase candidate may be selected. The next phrase candidate is the phrase candidate in the document 120 that is adjacent to the phrase candidate selected during the last iteration of step 515.

Similarly, at step 520, the part-of-speech map may be used to identify one or more numbers corresponding to the part-of-speech of each word in the selected phrase candidate. In at least some embodiments, a vector which represents the part-of-speech tag of each word in the selected phrase candidate may be created.

Steps 510, 515 and 520 are discussed in greater detail above with reference to FIG. 5.

Next, at step 630, in some embodiments, a bag-of-word numeric feature extraction may be performed for each word in the selected phrase candidate. The bag-of-word numeric feature extraction relies on a predetermined dictionary map which maps words to a unique numbers. That is, the dictionary map is a set of words in which each word is mapped to a number. By way of example and not limitation, the following is an example dictionary map:

"a"=1
"an"=2
"both"=3
. . .
"zoo"=546

The dictionary map may be saved in the memory 250 (FIG. 2) of the phrase identification system 160.

Accordingly, in some embodiments, at step 630, the dictionary map may be used to determine a number associated with each word in the selected phrase candidate. A vector may be created based on each number that is determined, from the dictionary map, to correspond to the word in the phrase candidate. The size of the vector may be related to the number of words and/or unique numbers in the dictionary map. By way of example, a dictionary map with a size of 546 words, such as the example dictionary map above, may, in some embodiments, be of the $546^{th}$ dimension. It will, however, be appreciated that vectors of different size could also be used.

In some embodiments, at step 640, rule matching may be performed on each word of the selected phrase candidate to determine whether the word satisfies one or more predetermined rules. The rules may be predefined. By way of example and not limitation, some examples of rules are:

The first letter of this word is capitalized.
All letters are capitalized.
Contain a digit letter.
All letters are digit letter.
This word is stop-word.

The words in the selected phrase candidate may be evaluated against each rule in a rule set and a vector may be created based on the result. The size of the vector that may be created at step 640 may correspond to the number of rules in the rule set. For example, an L-dimension binary number vector may be created if the number of rules in the rule set is L. An element in the vector may be set to 1 if a rule corresponding to that element is satisfied. If the rule is not satisfied, the corresponding element may be set to 0.

By way of example, using the example rules identified above, the vector for "Both" may be: 1 0 0 0 1, since the first letter of the word is capitalized and since the word may, in at least some embodiments, be a stop-word.

However, others formats of numeric vector representation are contemplated by the present disclosure.

Next, at step 530, part of speech numeric feature extraction may be performed on each context word of the selected phrase candidate in the manner discussed above with respect to FIG. 5. As described with respect to FIG. 5, one or more vectors may be created based on the result of the numeric feature extraction of each context word.

In some embodiments, at step 650, the dictionary map discussed above in relation to step 630 may be used to determine a number associated with one or more context words of the selected phrase candidate. Accordingly, in some embodiments, at step 650, the dictionary map may be used to determine a number associated with each context word of the phrase candidate. A vector may be created based on each number that is determined, from the dictionary map, to correspond to the context word.

In some embodiments, at step 660, rule matching may be performed on one or more context word of the selected phrase candidate in order to determine whether the one or more context word satisfies one or more predetermined rules. The step 660 may be performed in a manner similar to the step 640 discussed above. The context words of the selected phrase candidate may be evaluated against each rule in a rule set and a vector may be created based on the result.

In some embodiments, at step 670, the number of context words associated with the selected phrase candidate may be counted and a further vector created in order to represent those counts. In at least some embodiments, the number of context words to the left of the phrase candidate and the number of context words to the right of the phrase candidate may each be counted.

In at least some embodiments, to ensure that vectors are of a consistent size, an upper limit may be placed on the number of context words that may be considered. For example, in at least some embodiments, if the number of context words in any direction exceeds a predetermined limit, then the number of context words in the vector will be set to that predetermined limit. For example, if the predetermined limit is set to four, then if five context words are counted to the right of a phrase candidate, then the count will be set to four.

By way of example, if the predetermined limit were set to four, in the example discussed throughout this application (i.e. "Both Westwood Brick and Westwood Group are based in Boston."), "Both Westwood" has zero context words to the left and eight context words to the right. The binary number vector representation of these two numbers may be:

0 0 0 0 (representing zero left context words)
0 0 0 1 (representing four right context words)

It will be appreciated that other vector representations are also possible. For example, in another embodiment, all elements of the vector may be set to 1 if the number of context words exceeds a predetermined threshold. For example, in the example given above, where the threshold is four, the vector 0 0 0 0 may indicate that there are zero left context words and the vector 1 1 1 1 may indicate that there are more than four right context words.

Next, at step 680, in some embodiments, part-of-speech numeric feature extraction may be performed based on a part-of-speech sequence (which may also be referred to as a part of speech combination) associated with the selected phrase candidate. Step 680 may rely on a predetermined part-of-speech sequence map which maps sequences of part-of-speech tags to unique numbers. Each part-of-speech sequence identifies a combination of two or more parts of speech.

Step 680 may, therefore, include a step of looking up, or otherwise determining a part-of-speech sequence associated with the phrase candidate in the part-of-speech sequence map.

The part-of-speech sequence map may, in at least some embodiments, rely, at least in part, on the part-of speech map discussed previously. In at least some embodiments, a mathematical algorithm may be performed to determine, from each part-of-speech in the part of speech sequence and from the part-of-speech map, a unique number representing the combination.

By way of example and not limitation, the algorithm to identify a unique number representing the part-of-speech sequence of a selected phrase candidate may be determined according to the following equation for a phrase candidate with two words: (POS1−1)*POS_SIZE+(POS2), where POS1 is the number associated with the part-of-speech of the first word in the phrase candidate (as determined from the part-of-speech map), POS_SIZE represents the number of part-of-speech tags included in the part-of-speech map, and POS2 is the number associated with the part-of-speech of the second word in the phrase candidate (as determined from the part-of-speech map).

For example, using the example considered throughout this disclosure, "Both Westwood" has a part-of-speech combination "DT NNP". (i.e. DT represents a word that is a determiner; NNP represents a singular proper noun). DT may be mapped to the number three in the part-of-speech map and NNP may be mapped to the number fourteen in the part-of-speech map. There may be forty-six possible tags in the part-of-speech map. In such an example, "DT NNP" may be mapped to (3−1)×46+14=106.

A vector may be created based on the number which is determined to be associated with the part-of-speech sequence or combination. The number which is determined to be associated with the part-of-speech sequence or combination may specify a position in a vector. In at least some embodiments, the value at that position in the vector may be set to one (1) in order to indicate the part of speech sequence corresponding to the selected phrase candidate.

Next, at step 690, in some embodiments, part-of-speech numeric feature extraction may be performed based on a part-of-speech sequence (or combination) associated with a boundary word combination of the phrase candidate. Boundary words are words at or near the beginning and end of the phrase candidate. Left Boundary words include the left-most phrase word and its left context word neighbour. Similarly, right boundary words include the right-most phrase word and its right context neighbour.

At step 690, part-of-speech numeric feature extraction may be performed based on the part-of-speech sequence associated with a left boundary word combination, and also for a right boundary word combination. The left boundary word combination is comprised of the left-most phrase word and its left context word neighbour. Similarly, the right boundary word combination is comprised of the right-most phrase word and its right context neighbour.

By way of example, in the example discussed throughout this disclosure, the phrase candidate "Both Westwood" does not have a left context word. Accordingly, there is no left-boundary word combination. The right boundary word-combination is, however, "Westwood Brick" since the right-most word is "Westwood" and its right context neighbour is "Brick."

Step 690 may rely on the predetermined part-of-speech sequence map which maps sequences of part-of-speech tags to unique numbers. Each part-of-speech sequence identifies a combination of two or more parts of speech.

Step 690 may, therefore, include a step of looking up, or otherwise determining a part-of-speech sequence associated with the boundary word combinations of a selected phrase candidate in the part-of-speech sequence map.

As noted above with reference to step 680, the part-of-speech sequence map may, in at least some embodiments, rely on the part-of speech map discussed previously. In at least some embodiments, a mathematical algorithm may be performed to determine, from each part-of-speech in the part of speech sequence and from the part-of-speech map, a unique number representing the combination.

One or more vectors may be created based on the number which is determined to be associated with the part-of-speech sequence or combination for the boundary word combinations.

Next, at step 692, a numeric feature representation may be created for the selected phrase candidate. The numeric feature representation is created in a manner similar to that described above with respect to step 540 of FIG. 5.

The numeric feature representation is created based on the numbers and/or vectors identified at steps 520, 630, 640, 530, 650, 660, 670, 680, and/or 690 of FIG. 7.

In some embodiments, the numeric feature representation may be created by concatenating (or otherwise joining) together the vectors created at these various steps in a predetermined manner in order to create a larger vector. This larger vector numerically represents features of the selected phrase candidate. That is, all of the feature vectors created in the above feature extraction steps for a selected phrase candidate may be put together in order to create one vector for the selected phrase candidate.

It will be appreciated that variations of the methods and systems described above are also possible. For example, various embodiments may omit some of the steps 520, 630, 640, 530, 650, 660, 670, 680, and/or 690 of FIG. 7 in which various features are identified and vectors are created. In other embodiments, additional features of phrase candidates may be identified apart from those discussed above.

Next, at step 560, a determination may be made as to whether there are any additional phrase candidates in the document 120. If there are additional phrase candidates, numeric feature representations may be obtained for each of those phrase candidates in the manner described above with reference to steps 520, 630, 640, 530, 650, 660, 670, 680, and/or 690. If there are not any additional phrase candidates in the document 120, step 330 may end.

While the present disclosure is primarily described in terms of methods, a person of ordinary skill in the art will understand that the present disclosure is also directed to various apparatus, such as a server and/or a document processing system, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, and articles of manufacture also come within the scope of the present disclosure.

While the processes 300, 400, and the sub-steps of steps 330 of FIGS. 5 and 6 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of identifying phrases in an electronic document comprising:
    identifying one or more phrase candidates in the electronic document;
    selecting one of the phrase candidates;
    numerically representing features of the selected phrase candidates to obtain a numeric feature representation associated with that phrase candidate by:
        identifying, from a predetermined dictionary map which maps words to unique numbers, the number associated with each word in the selected phrase candidate; and
        including the identified number associated with each word in the numeric feature representation;
    inputting the numeric feature representation into a machine learning classifier, the machine learning classifier being configured to determine, based on each numeric feature representation, that the phrase candidate associated with that numeric feature representation is a phrase, wherein identifying phrase candidates in the electronic document comprises identifying word level n-grams in the document; and
    associating the electronic document with a label identifying the subject matter of the electronic document, wherein the label is based on the phrase.

2. The method of claim 1, wherein identifying word level n-grams comprises identifying word level n-grams which are of a size that is greater than or equal to two words.

3. The method of claim 1, wherein identifying word level n-grams comprises identifying word level n-grams which are of a size that is greater than or equal to a first predetermined threshold and less than or equal to a second predetermined threshold.

4. The method of claim 1, wherein identifying phrase candidates in the electronic document further comprises applying a rule-based filter to the word level n-grams.

5. The method of claim 1 wherein numerically representing features of the selected phrase candidates comprises:
    performing part of speech tagging on each word in the selected phrase candidate;
    determining one or more numbers associated with the part of speech of the words in the selected phrase candidate; and
    determining the numeric feature representation associated with the selected phrase candidate in accordance with the numbers associated with the part of speech of the words in the phrase candidate.

6. The method of claim 5 wherein numerically representing features of the phrase candidates further comprises:
    performing part of speech tagging on one or more words adjacent to the selected phrase candidate;
    determining one or more numbers associated with the part of speech of the words adjacent to the selected phrase candidate; and
    determining the numeric feature representation associated with the phrase candidate in accordance with the numbers associated with the part of speech of the words adjacent to the selected phrase candidate.

7. The method of claim 1 further comprising, prior to identifying:
    training the machine learning classifier with training data, the training data including one or more electronic training documents and one or more phrase labels which identify one or more phrases in the electronic training documents.

8. The method of claim 1 further comprising saving the identified phrases in a memory.

9. The method of claim 1, further comprising:
    categorizing the electronic document based on the associated label.

10. A phrase identification system for identifying phrases in an electronic document, comprising:
    a memory;
    one or more processors, configured to:
        identify one or more phrase candidates in the electronic document;
        select one of the phrase candidates;
        numerically represent features of the selected phrase candidates to obtain a numeric feature representation associated with that phrase candidate by:
            identifying, from a predetermined dictionary map which maps words to unique numbers, the number associated with each word in the selected phrase candidate; and
            including the identified number associated with each word in the numeric feature representation;
        input the numeric feature representation into a machine learning classifier, the machine learning classifier being configured to determine, based on each numeric feature representation, that the phrase candidate associated with that numeric feature representation is a phrase, wherein identifying phrase candidates in the electronic document comprises identifying word level n-grams in the document; and,
        associate the electronic document with a label identifying the subject matter of the electronic document, wherein the label is based on the phrase.

11. The phrase identification system of claim 10, wherein identifying word level n-grams comprises identifying word level n-grams which are of a size that is greater than or equal to two words.

12. The phrase identification system of claim 10, wherein identifying word level n-grams comprises identifying word level n-grams which are of a size that is greater than or equal to a first predetermined threshold and less than or equal to a second predetermined threshold.

13. The phrase identification system of claim 10, wherein identifying phrase candidates in the electronic document further comprises applying a rule-based filter to the word level n-grams.

14. The phrase identification system of claim 10 wherein numerically representing features of the selected phrase candidates comprises:
    performing part of speech tagging on each word in the selected phrase candidate;

determine one or more numbers associated with the part of speech of the words in the selected phrase candidate; and determine the numeric feature representation associated with the selected phrase candidate in accordance with the numbers associated with the part of speech of the words in the phrase candidate.

15. The phrase identification system of claim 14 wherein numerically representing features of the phrase candidates further comprises:

performing part of speech tagging on one or more words adjacent to the selected phrase candidate;

determining one or more numbers associated with the part of speech of the words adjacent to the selected phrase candidate; and determining the numeric feature representation associated with the phrase candidate in accordance with the numbers associated with the part of speech of the words adjacent to the selected phrase candidate.

16. The phrase identification system of claim 10 wherein, prior to identifying, the one or more processors are further configured to:

train the machine learning classifier with training data, the training data including one or more electronic training documents and one or more phrase labels which identify one or more phrases in the electronic training documents.

17. The phrase identification system of claim 10 wherein the one or more processors are further configured to save the identified phrases in the memory.

18. The phrase identification system of claim 10, wherein the one or more processors are further configured to:

categorize the electronic document based on the associated label.

* * * * *